United States Patent
Peterson et al.

(10) Patent No.: US 6,327,551 B1
(45) Date of Patent: Dec. 4, 2001

(54) SYSTEM DESIGN METHOD

(75) Inventors: Mats Peterson, Malmö; Leif Hedman, Kuäred, both of (SE)

(73) Assignee: Televerket, Farsta (SE)

( * ) Notice: Subject to any disclaimer, the term of this patent is extended or adjusted under 35 U.S.C. 154(b) by 0 days.

(21) Appl. No.: 08/436,498

(22) Filed: May 8, 1995

Related U.S. Application Data

(63) Continuation of application No. 07/965,719, filed on Oct. 23, 1992, now abandoned.

(30) Foreign Application Priority Data

Nov. 1, 1991 (SE) .................................................... 9103210

(51) Int. Cl.[7] .................................................... G06F 17/50
(52) U.S. Cl. .................................... 703/1; 703/17; 716/5; 700/97; 700/98; 706/45; 706/46; 705/7
(58) Field of Search .................................. 364/578, 401, 364/402, 468; 395/10, 50, 51; 703/1, 17; 716/5; 700/97, 98; 706/45, 46; 705/7

(56) References Cited

U.S. PATENT DOCUMENTS

| | | | |
|---|---|---|---|
| 4,942,527 | * | 7/1990 | Schumacher .......................... 364/401 |
| 4,965,743 | * | 10/1990 | Malin et al. ...................... 364/578 X |
| 5,111,392 | * | 5/1992 | Malin ................... 364/401 |
| 5,126,936 | * | 6/1992 | Champion et al. .............. 364/401 X |
| 5,214,579 | * | 5/1993 | Wolfberger et al. ............. 364/401 X |
| 5,235,508 | * | 8/1993 | Lirov et al. .......................... 364/402 |
| 5,241,645 | * | 8/1993 | Cimral et al. ..................... 364/578 X |
| 5,255,181 | * | 10/1993 | Chapman et al. .................... 364/401 |
| 5,299,287 | * | 3/1994 | Tsuruta et al. .......................... 395/51 |
| 5,303,147 | * | 4/1994 | Oba et al. ........................... 364/402 |
| 5,303,170 | * | 4/1994 | Valko ................................... 364/578 |
| 5,307,295 | * | 4/1994 | Taylor et al. ......................... 364/578 |
| 5,321,605 | * | 6/1994 | Chapman et al. ................... 364/402 |
| 5,369,732 | * | 11/1994 | Lynch et al. ........................... 395/51 |
| 5,392,382 | * | 2/1995 | Schoppers .............................. 395/10 |

OTHER PUBLICATIONS

Julian W. Vincze, "Software Review: Expert Choice", Decision Line, Mar. 1990, pp. 10–12.*
Li et al., Fire–Fighter a Decision Support System For Fire Management, IEEE Conf., May 9–10, 1991, pp. 573–576.*
Thomas L. Saaty, "Decision Making For Leaders", RWS Publications, 1988, pp. 3–33.*

* cited by examiner

*Primary Examiner*—Eric B. Stamber
(74) *Attorney, Agent, or Firm*—Oblon, Spivak, McClelland, Maier & Neustadt, P.C.

(57) ABSTRACT

A computerized design system is employed for designing product specifications for a multitude of products. This computerized design system uses an input from a user to define a series of goals and from these goals to create a data structure which is extracted from the goals. This data structure is then topologically stored in a computer memory which is then used to create a mapping between requirement specifications and a conceptual design. An output is then provided which can be used as a final design specification.

7 Claims, 10 Drawing Sheets

SYSTEM DESIGN METHOD

This application is a Continuation of application Ser. No. 07/965,719. filed on Oct. 23. 1992 now abandoned.

The invention relates to a method of designing, systems, products and services, particularly information systems used in the design of new telecommunications services, and a design engine for implementing the method.

There are few design processes suitable for the systematic design of information systems. Those design techniques which are known all employ prototyping, as does the method of the present invention. For the purposes of this patent specification prototyping should be regarded as the same as emulation. The four principal approaches to information systems design are:—the waterfall life-cycle model, prototyping, operational specification and transformational implementation.

The waterfall life-cycle model comprises a series of process steps, as illustrated in FIG. 1 and is an analytic approach which is sometimes referred to as such. It starts with a set of requirements and proceeds via implementation and other process steps to an operations and maintenance process. Feedback is possible between adjacent processes in the design sequence and the following processes may be included sequentially:

System feasibility

Software requirements

Preliminary design

Detailed design

Code and debug

Test and pre-operation

Operations maintenance

It should be noted that the earlier in the process that an error occurs the greater the cost of correction. It is therefore critical to avoid errors in the early process steps.

Prototyping requires the implementation of a simple version of the system under design (target design) which is then revised in a number of ensuing prototyping cycles, each cycle resulting in a prototype. The number of prototypes may vary from a few to several hundreds or even thousands, and may be followed by reimplementation of a final prototype in some delivery environment.

The operational specification technique requires that the system specification, or representation is written in a language or has a form that allows it to function as a prototype of the system under design. This facilitates evaluation, modification and maintenance of the system. At the present time, this approach is, for the most part, limited to research applications and its industrial application has usually been limited to "toy systems". However there are a number of powerful operational specification systems which are industrially applicable in the field of user interface design.

Transformational implementation entails the automatic generation of a program from a specification. It is in many ways similar to the waterfall approach in that it starts with a specification and ends with a program. However in the transformational approach the transformation from specification to program is automatic and therefore eliminates the introduction of errors. The transformational approach is primarily a research tool, although it has been successfully applied to the production of prototypes.

The design method of the present invention is an analytic technique which builds on and improves the waterfall approach and uses prototyping. In the initial two steps of the design method of the present invention system feasibility and software requirements are documented in the form of a usage requirement specification. This specification is an expression of the market opportunity in terms of the expected users goals, constraints imposed by users, economic and technical factors and desired performance. The goals are decomposed and by performing a functional requirement analysis on the results from this process the main input to the preliminary design is produced, together with service states, which are states of the system allowing users to reach their goals, and service tasks, which are tasks that change the system into corresponding service states. This process is illustrated in FIG. 4.

The next step in the design procedure is a process of top down interface design which entails decomposing service states and tasks and the design of system objects and functions. This process is structured with the aid of a user interface reference model illustrated in FIG. 5. The user model is an important aspect of the present invention. In the description of the invention in this specification the phases of preliminary and detailed design have been replaced by the sequential activities of design and formalization. This dichotomy does not necessarily reflect any real structure in the process but is used as a means of clarifying the description of the invention.

In today's markets it is frequently necessary to produce extremely complex custom-tailored systems with great expedition. This requires the use of efficient methods for the design of systems and products. The present invention fully satisfies these requirements and has many other advantages.

The present invention has a number of novel aspects which contribute to its value and which are not employed in other design processes. These are described below.

1. The method offers a way of structuring requirement specifications through the use of a state approach.
2. The method offers a novel way of structuring specifications or representations through a layered approach.
3. The method is generic and can be implemented in a number of problem specific ways.
4. The method is formal or if so desired semi-formal, in all process steps from the start of the design process to the final result. This is achieved in a manner that facilitates participation by customers, users and other parties interested in the design.
5. The method uses a structured approach. This makes it possible to produce a number of products or final deliverables from the design work. For example the deliverables could include the final (target) system, specifications at several levels of abstraction and prototypes of the final system at several levels of abstraction.
6. The method's approach supports the production of what may be referred to as equivalence classes of products, e.g. computer systems of equivalent functionality but with different user interfaces or computer systems of equivalent functionality running on different hardware.
7. The method is table supported which increases its power through the check list properties of tables and increased participation of customers, users and other interested parties.
8. The method has a structured approach to verification and validation. The use of layers gives structure to the validation and verification of specifications produced by the method.
9. The method supports usability evaluation of the results produced. (This is a validation activity). The method supports a variety of types of cognitive evaluation of results produced at the various levels created by the layered approach.
10. The method supports the reuse of design components. Components from lower layers can be reused in the transition between layers.

11. The method supports several implementation paradigms for example object orientated and functional implementations. Other implementation paradigms can also be used.
12. The method is orientated towards the design of what is sometimes referred to as IWS (Integrated Work System) which includes users and user organisations as well as the information system per se.
13. The method places a strong emphasis on all of the following three activities:
   requirements capture and analysis
   design
   validation
   whether prototyping is employed in the method or not. This gives a balanced approach in contrast to prior art techniques which focus on the design activity and do not employ usability analysis in the validation stage of the design process.
14. The method, structures design in the design of services, systems and products and works equally well on all types of design.
15. The method partially isolates the design of the user interface from the design of the rest of the system. This facilitates the design of more than one type of user interface which is of considerable importance when the system will be used in several different types of environment or by persons with widely differing skill levels.

It is an object of the present invention to provide an improved method for the design of products, systems and services which has some or all the advantages, and employs one or more of the novel aspects, listed above. It should be realised that the invention gives a significant advantage over the prior art even when only one or two of its novel aspects are employed.

According to a first aspect of the present invention there is provided a method and system of designing a product, system or service by deriving a requirement specification for said product, system or service from a user model embodied in the form of a usage specification characterised in that the final design is generated via the steps of:
   conceptual specification,
   functional specification,
   interface specification, and
   device specification,
establishing mutual relationships between the user model and the steps of conceptual specification, functional specification, interface specification, and device specification, operating on the said mutual relationship to modify the steps of conceptual specification, functional specification, interface specification and device specification, and hence the requirement specification for the product system or service under design in response to changes in the user model.

According to a second aspect of the present invention there is provided a method and system for designing a product, system or service by deriving a requirement specification for said product, system or service from a user model embodied in a usage specification characterised in that the method includes the steps of:
   determining the primary user goal or goals from the user model,
   deriving a subgoal structure from said primary goal or goals,
   deriving definitions for service states of said product, system or service from said subgoal structure, and thereby
   deriving definitions of service tasks and service objects for said product, system or service.

Preferably said method and system is characterised in that said subgoal structure is derived from a set of subgoals by selecting a subset thereof which covers all aspects of the main goal or goals.

Preferably said method and system is further characterised in that said user model incorporates market opportunity in terms of user goals, user constraints, economic and technical factors, and desired performance characteristics for said product, system or service.

According to a third aspect of the present invention there is provided a method of producing a new service from a series of existing service features by constructing a features manager, in which a requirement specification for said features manager is derived from a user model embodied in a usage specification characterised in that the method includes the steps of:
   determining the primary user goal or goals from the user model,
   deriving a subgoal structure from said primary goal or goals,
   deriving definitions of service states of said features manager from said subgoal structure, and thereby
   deriving definitions of service tasks and service objects for said features manager.

According to a fourth aspect of the present invention there is provided a design engine, for use in the design of a product, system or service, in which a requirement specification for said product, system or service is derived from a user model embodied in the form of a usage specification, characterised in that the design engine includes first means, for performing a requirement specification, second means, for performing a conceptual specification, third means, for performing a functional specification, fourth means, for performing a device specification and fifth means, for performing an interface specification said first, second, third, fourth and fifth means coupled together in a cooperative working relationship through generator means, and means for storing representations of various design aspects derived from the conceptual specification, functional specification, device specification and interface specification.

According to a fifth aspect of the present invention there is provided a design engine, for producing a requirement specification of a product, system or service from a user model embodied in a usage specification of said product, system or service, characterised in that said design engine includes storage means for said user model, means for deriving primary user goals from said user model, storage means for storing a representation of primary user goals, means for deriving a subgoal structure from said primary goals, storage means for storing a topological representation of said subgoal structure, means for deriving service states of said product, system or service from said subgoal structure, storage means for storing representations of said service states, means for generating service tasks and service objects from said service states and the topological representation of said subgoal structure and storage means for storing representations of said service tasks and service objects, the requirement specification comprising the aggregate of the representations of subgoals, service states, service objects and service tasks.

Preferably said design engine is characterised in that means are provided to continuously update the content of said storage means for said design model.

Preferably said design engine is further characterised in that the means for performing the conceptual specification includes storage means for storing a representation of subsystems, a storage means for storing a representation of toolboxes, and generating means for generating said two last mentioned representations arranged so that it can access a representation of service states.

According to a sixth aspect of the invention there is provided a design engine for producing a requirement specification, for a features manager for a new service created from a plurality of known service features, from a user model embodied in a usage specification of said new service characterised in that said design engine includes storage means for said user model, means for deriving primary user goals from said user model, storage means for storing a representation of primary user goals, means for deriving a subgoal structure from said primary goals, storage means for storing a topological representation of said subgoal structure, means for deriving service states for said features manager from said subgoal structure, storage means for storing representations of said service states, means for generating service tasks and service objects from said service states and the topological representation of said subgoal structure and storage means for storing representations of said service tasks and service objects, the requirement specification comprising the aggregate of representations of subgoals, service states, service objects and service tasks.

A method of designing systems, services and products in accordance with the invention will now be described in greater detail, by way of example, with reference to the accompanying drawings, in which.

Figure 1:
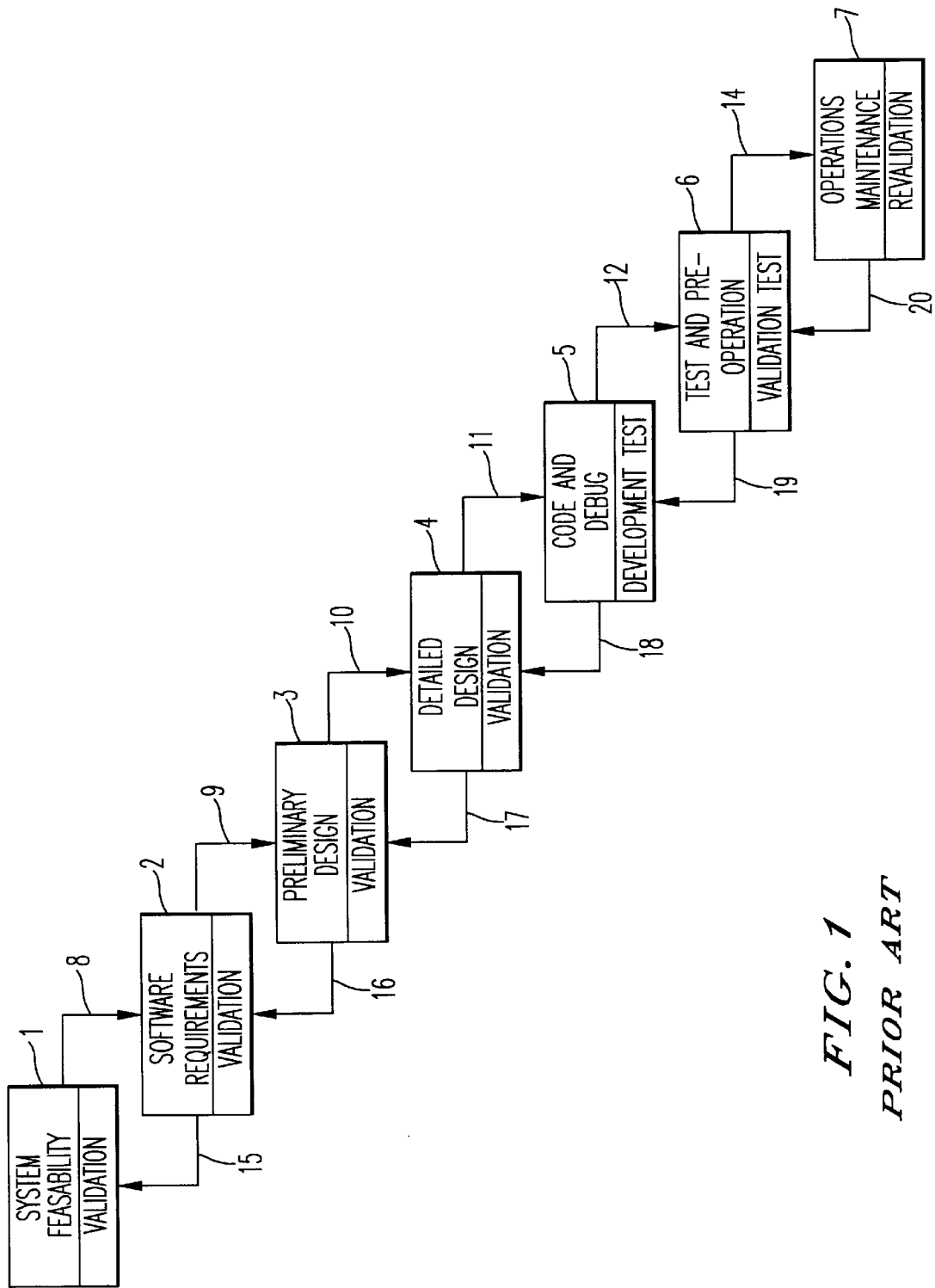
FIG. 1 is a diagrammatic representation of the waterfall software development life cycle model.

Referring to the drawings, and FIG. 1 in particular, there is shown a diagrammatic representation of the waterfall software development life cycle model. It is important to understand this technique to appreciate the relationship of the invention to the prior art and the advantages of the present invention over the prior art. The waterfall method comprises a series of steps 1–7 performed sequentially. Each step passing through paths 8–14 to the next step in the sequence. Feedback between adjacent steps is possible via paths 15–20. Each step includes a validation or testing process which may reveal errors or the need for design modification. The individual steps in the design process are:

system feasibility study, followed by a validation process, 1;

determination of software requirements followed by validation, 2;

preliminary design followed by validation, 3;

detailed design followed by validation, 4;

coding and debugging phase followed by a development test, 5;

system test and pre-operation phase followed by validation, 6; and finally operation and maintenance phases followed by revalidation, 7.

It should be apparent that if an error in the initial system feasibility study is discovered during the pre-operation phase the cost of correction will include revisiting all the step of the design process, and will be substantial.

Figure 2:
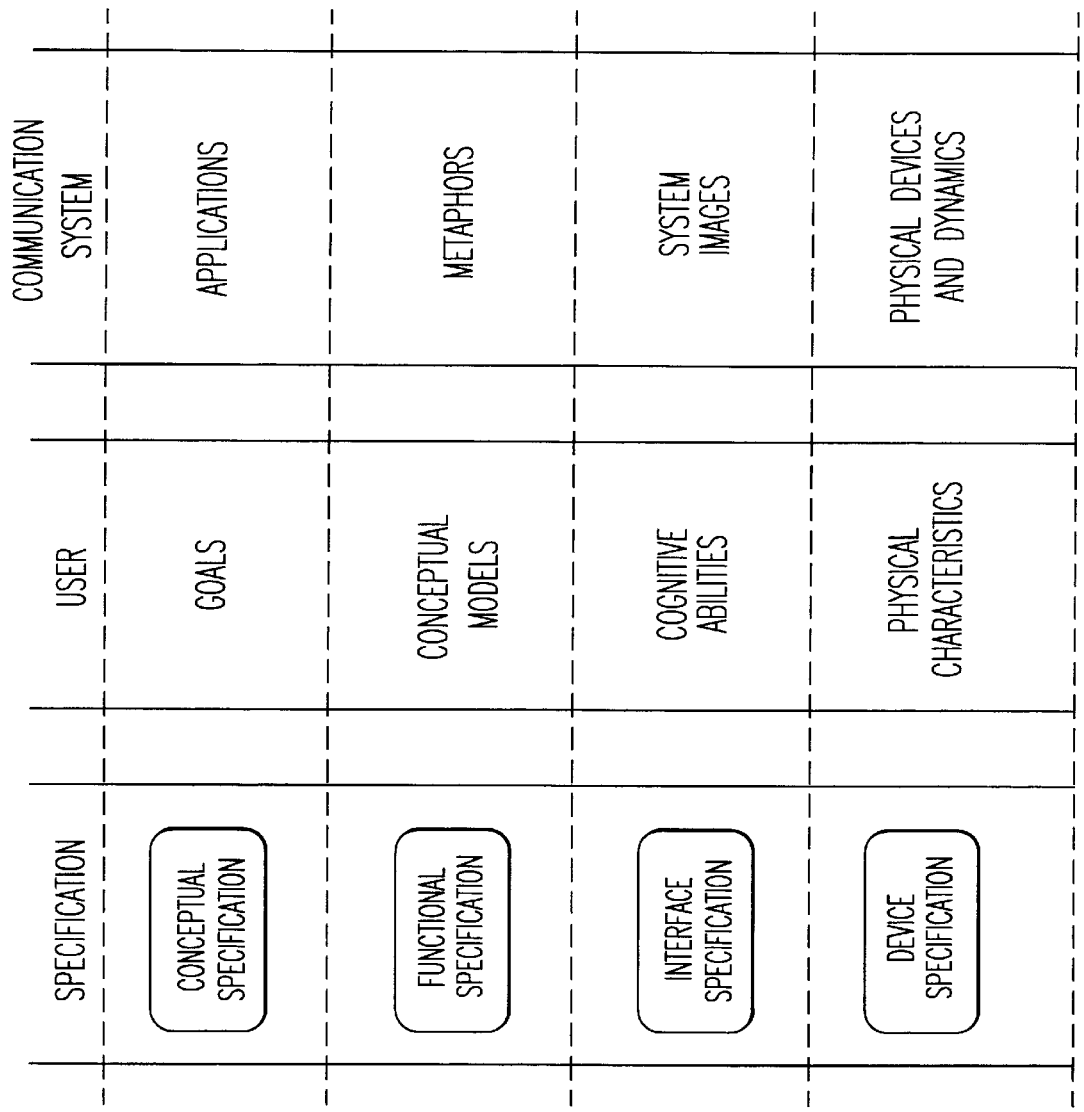
FIG. 2 illustrates the relationship between the protocol structures of the design specifications, the user model and a target system.
Figure 3:
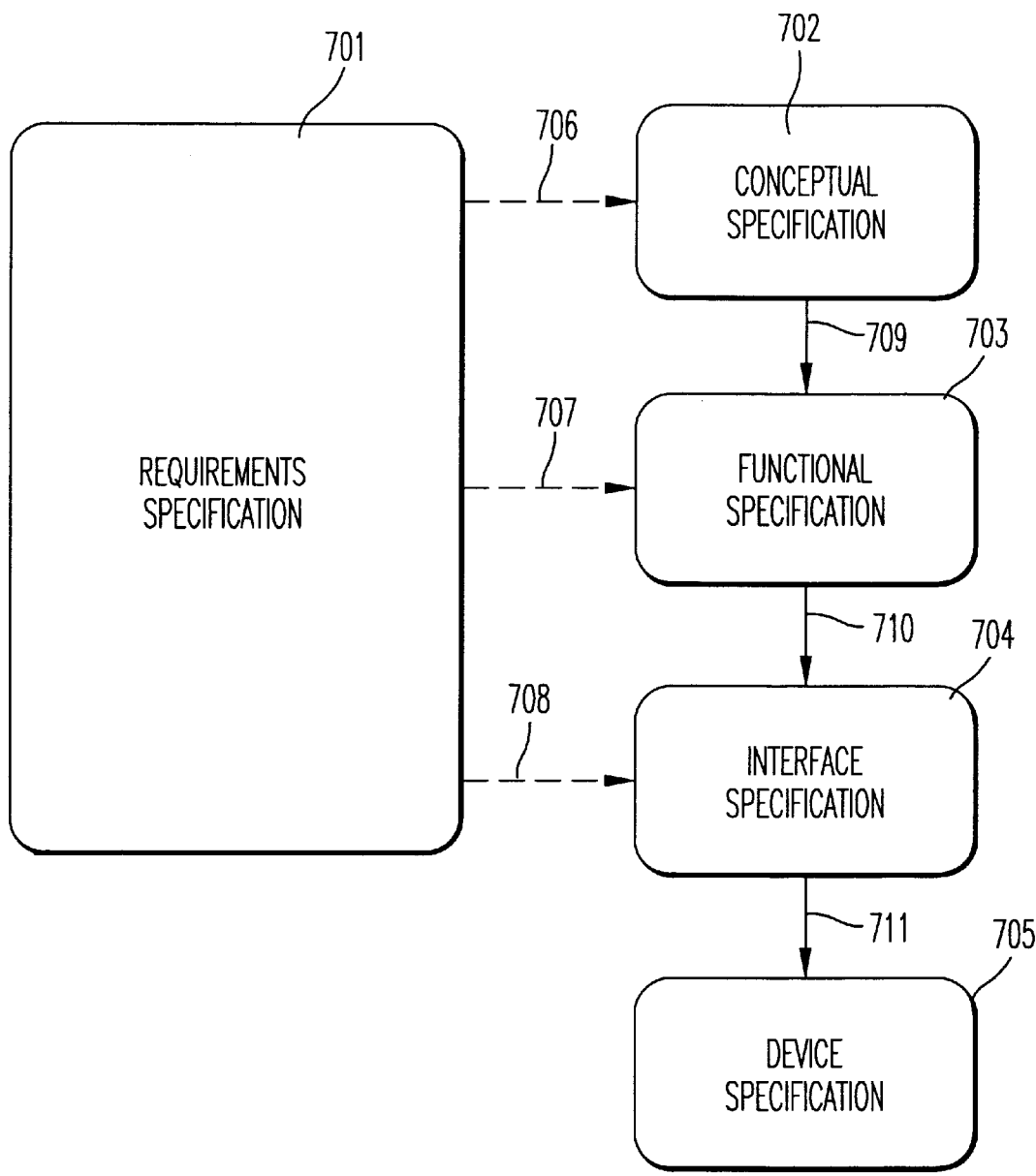
FIG. 3 shows the main components of the design specification and the mapping between the requirements specification and the conceptual design and functional representations.

The design method of the present invention is built on a user centred approach which starts with a usage specification expressing the market opportunity in terms of the expected user goals, user imposed constraints, economic and technical factors and the desired performance characteristics. Following on from the development of the usage requirement specification a number of activities need to be performed resulting in the development of further specifications, see FIG. 3. It should be noted that backtracking or feedback can occur at all stages of the process. Wherever in FIG. 4 more than one arrow exits to adjacent processes both paths must be taken. The path which is followed first is either determined by the situation in hand or is not critical. Paths between processes which are not indicated by arrows may also be taken depending on the situation in hand. The relationship between the set of specification processes which comprise the conceptual specification 702, the functional specification 703, the interface specification 704, the device specification 705, and the user and the target communication system is illustrated in FIG. 2. Thus it can be seen that the conceptual specification corresponds to the user goals and system applications, while the device specification corresponds to the users physical characteristics and the physical devices and dynamics of the target system. While the operation of the method of the invention is described here with reference to a communications system it should not be forgotten that this is just one example of the application of the invention and it could equally well be applied in many other situations.

The method of the present invention can be used in a number of implementation specific ways. One important use parameter, perhaps the most important, is that which discriminates between product design, system design or service creation. An important requirement for carrying out specification work is the existence of a detailed domain model. This model may be in the form of a document.

After the market opportunity has been described, task analysis is used to breakdown or decompose the main goal into a set of sub-goals or sub-sub-goals. A functional requirement analysis of the goal tasks then identifies the service states, i.e the states of the work system that enable users to complete their goals, the associated service tasks, i.e. the set of tasks necessary to produce the service states, and the requirements placed on these tasks. Finally, what may be described as a top down interface analysis is applied, in which the service states and their associated service tasks are further decomposed into interface objects and interface procedures using a layered user interaction reference model or UIRM. From this a number of specifications or representations of varying degrees of abstraction and detail together with their corresponding prototypes, validation, verification and usability evaluation can be produced. Of course the final system or a specification thereof can also be produced.

Figure 4:
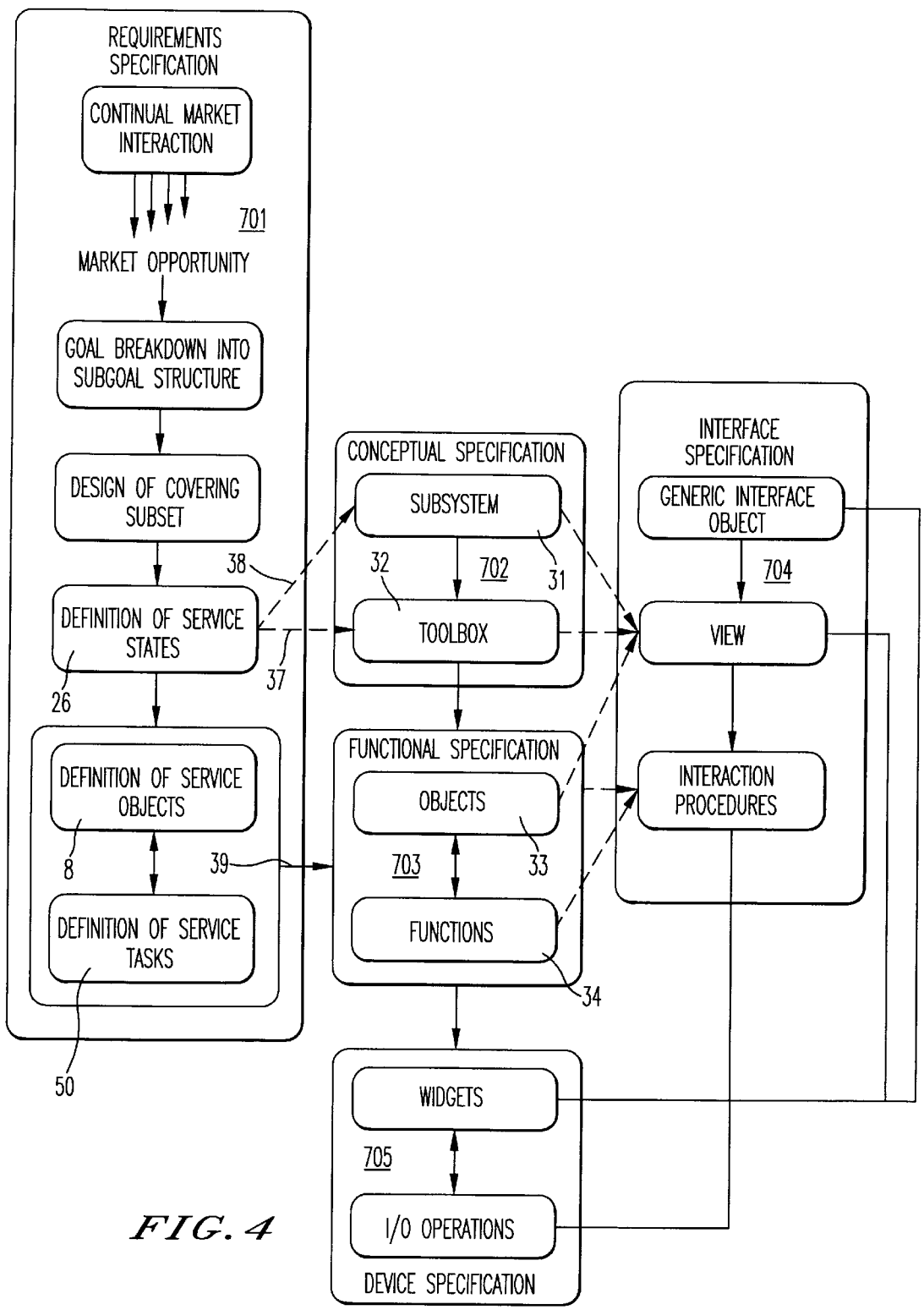
FIG. 4 is a diagrammatic representation of the individual steps or processes of the invention.

The process can be augmented with the aid of prototyping, validation and verification at specific stages of the process. Natural stages for the production of prototypes are:

after service state specification, 26 in FIG. 4;

after conceptual specification, 702;

after functional specification, 703; and after interface specification, 704.

The prototypes designed after conceptual or functional specification are in general not full prototypes but are intended to test only certain aspects of the specification process or representations produced thereby. The process illustrated in FIG. 3 can in a given design situation be augmented by prototyping and employed in a variety of ways. Some examples are set out below.

EXAMPLE 1

Generate the requirements specification, map this to the conceptual specification and then map both the requirements specification and conceptual specification to the functional specification. Continue with mapping these specifications to the interface specification and finalise the specification work by means of a mapping to a device specification. The next step could be a prototype to help validate the specifications.

EXAMPLE 2

Generate the requirements specification and build a prototype to verify this. Backtrack and adjust the requirement specification to eliminate deficiencies discovered during the validation of the prototype. Iterate this a suitable number of times. Map the requirements specification to the conceptual specification. If relevant a new prototype can be implemented to verify the mapping and the revised requirements specification. Backtrack and revise the mapping and requirements specification if deficiencies are discovered in the new prototype (this can be iterated if necessary). Next map the conceptual specification and the requirements specification on to the functional specification. At this stage, a prototype can again be implemented and employed as a validation tool. Finally the interface and the device specifications are completed. These can be validated with the use of a prototype.

EXAMPLE 3

Perform the goal breakdown into a sub goal structure and design the covering subset and service states. Map the resulting structure onto the conceptual specification. Validate this perhaps with the aid of a prototype. Continue with the definition of service tasks, service objects and service states, and then the functional specification (this can be done in parallel). Again, at this stage a prototype can be implemented. Finally, the interface and device specifications are realised together with the (optional) design of a prototype.

The method according to the present invention will now be considered in more detail. The starting point for the method is a market opportunity or a suitable set of market opportunities. The market opportunity can, and should, be further specified using the corresponding representation table shown in Table 1 below. Four phases of work then take place:—requirement specification, conceptual specification, functional specification and device specification. Each phase consists of a number of processes. In general there are iterations in the traversal of processes and phases so that the results of a previous process or phase can be modified as a consequence of a result in the current process or phase, and the design retraced with the modified information.

There are some restrictions on the order in which processes and phases are performed. Service state analysis is always performed (visited but not necessarily completed) before other phases. There will, in an actual design situation, be interleaving, backtracking and other types of in hand ordering of processes and phases. The internal ordering of the processes in the various phases varies greatly depending on the situation in hand.

Table 1

Representation of Main Goals

Main goal: Name of the main goal.

Description: A general description of the main goal.

Service states parameters:

User characteristics: A description of important user characteristics.

Customer characteristics: A description of important customer characteristics.

Work system: A description of the work system used.

Physical environment: A description of the physical environment.

Task features: A description of relevant task features. This may include security and access aspects.

Design aspects:

Design decisions: A description of why this, or these, breakdown(s) into subgoal tasks was chosen and a description of alternate breakdowns discussed and why these were not used.

References:

Subgoal: A list of the names of those subgoals that are formed in the breakdown of the main goal carried out in the goal decomposition.

Figure 5:
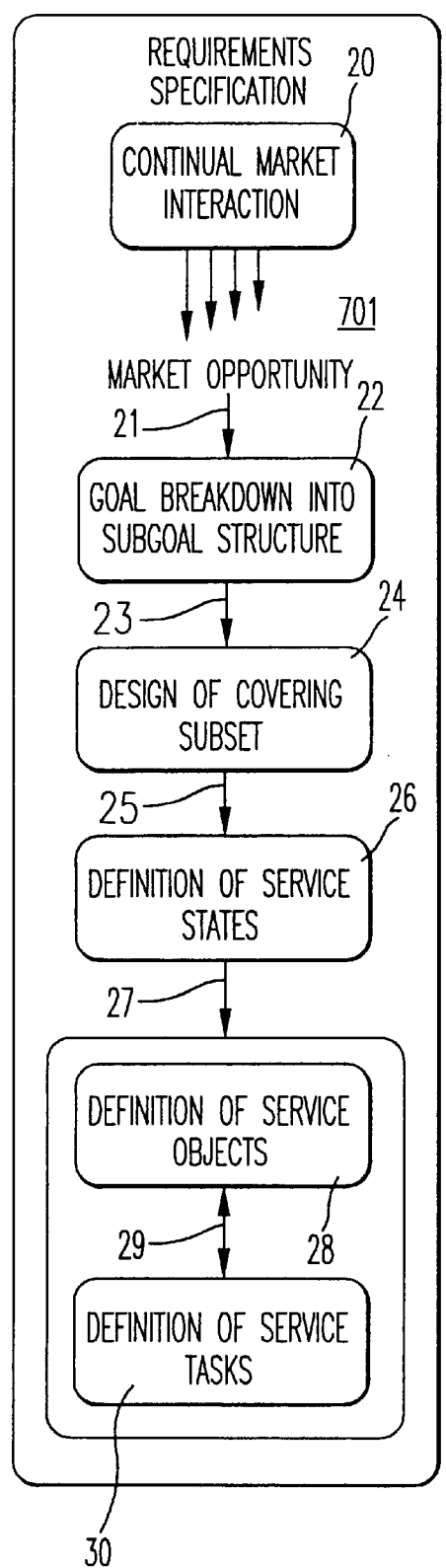
FIG. 5 is a diagrammatic representation of the process steps employed in the initial phase of the method according to the invention in the order in which they are carried out.

The manner in which service state analysis is performed will now be considered. The processes which are described below are not always performed in the order given, even though this is the usual order. There may be iterations as well as backtracking over all levels. The processes given may be interleaved with, for example, processes from the design specification. Possible orders of process traversal are given in the reference section of the tables corresponding to the process in question. One order of these processes is illustrated in FIG. 5.

Market opportunity:

The starting point for requirements analysis is an expression of a market opportunity derived from continual market interaction 20, in terms of the expected users goals, the constraints imposed by the users, economic and technical factors and by the desired performance and other metric properties of, and constraints on, technical factors. The market opportunity is preferably documented using the "Main Goal Representation" shown in Table 1. This table can, among other things, contain a description of users and customers of the target system, a description of the application domain with limitations on the domain and, very importantly, a description of the goal and associated task that the target system is to support. The purpose of this specification scheme for goals is to describe the market opportunity. The main part of this is the service state parameters together with the description of customers and users. Design aspects and references provide support for the design process. The reference heading in Table 1 indicates that the following activity should be the formation of subgoal tasks, 22 in FIG. 5.

Domain Modelling:

In general all the processes described in the method require a domain model. However, the formation of the domain model is not part of the method. The domain model can be produced in the context of market opportunity and background knowledge. It is important, if not essential, that the domain model is structured into tasks and objects.

It frequently happens that the application domain has properties making it impossible or unrealistically difficult to model with sufficient detail to ensure proper analysis and design in later phases. This can be overcome by the use of prototyping, backtracking and increased participation by users and other clients. The domain model can, in some cases, be complemented or even, in rare cases, be replaced by, user interaction procedures. An important example of this occurs in goal decomposition, where instead of using the domain model as the sole input for the decomposition, the user can carry out or assist in the goal decomposition. There are a variety of domain modelling languages and techniques which are well known in the art.

The term "user" often leads to misconceptions. A simple attempt to define the term leads to the following description of the usage of the terms "user" and "customer".

The customer (organisation) orders the system from a system supplier (in this context the system designer (organisation), but could be a retailer). The customer or supplier organisation delivers the system to the user organisation. The customer and the user often belong to the same organisation, which is one cause of confusion.

In general there are several types of users, these are often classified into two classes:

the professional user, who employs the system as a tool in solving his organisational task;

the local user the tasks of whom, when using the target system, are oriented towards the tool itself, for example maintenance and operation of the tool.

Goal decomposition (22 of FIG. 5):

This step entails the decomposition of user goals generated by the requirement specification 1 to a structure or hierarchy, which may be degenerate, of user goals or subgoals. A degenerate hierarchy is not a true hierarchy in the sense that identical nodes may be found at several places and at different levels in the hierarchy. An important technique supporting goal decomposition is task analysis. This technique is well known in the art.

Subgoals are connected through a set of tasks that correspond to work routines in carrying out the tasks in hand (achievement of the subgoals and goals). These tasks have as their objective, the establishment of circumstances which permit the attainment of subgoals. From this a network of IWS states can be produced. These states (service states) are the states of the IWS that allow users to perform the corresponding goal tasks.

The states are connected by a structure of service tasks given by the technological paradigm (i.e. the tasks that can be performed with, or with the aid of, the technology at hand). A service task is performed by the user or other component of the IWS in order to transform the IWS into a new service state thereby permitting another goal to be obtained. Note that the user plays an important role in the analysis. Also note that the design is oriented towards the entirety of the work system and not just to the information system.

Figure 7:
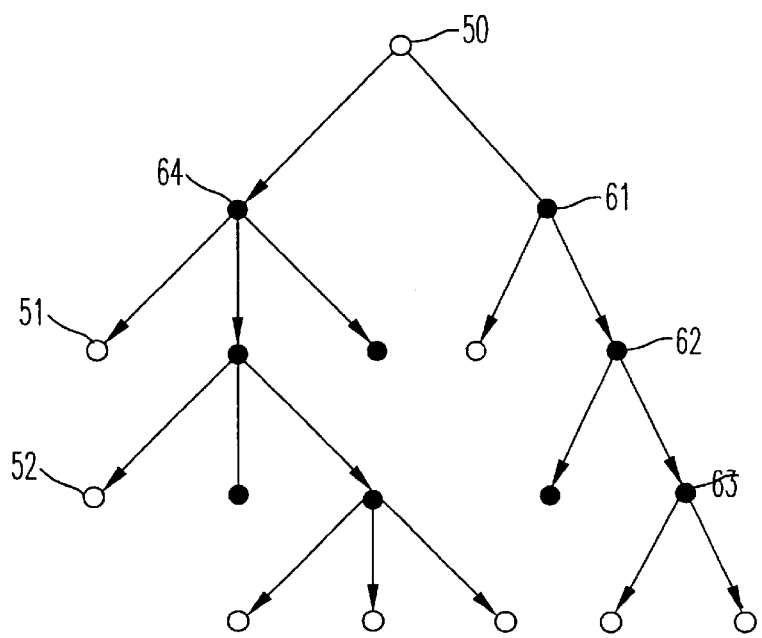
FIG. 7 illustrates how a main goal is decomposed into a structure of subgoals.

FIG. 7 shows in diagrammatic form a decomposition of a main goal 50 into subgoals 51, 64, 61 etc. A relevant subset consists of the nodes 51,52 indicated by unfilled circular dots. These unfilled circular dots indicate the subgoals that the service (system or product) is to support. The subgoals derived from the goal decomposition are preferably documented using a subgoal table, Table 2 below. Preparation of tables such as Table 2, is, of course, particularly important for all subgoals which the service is to support.

Figure 6:
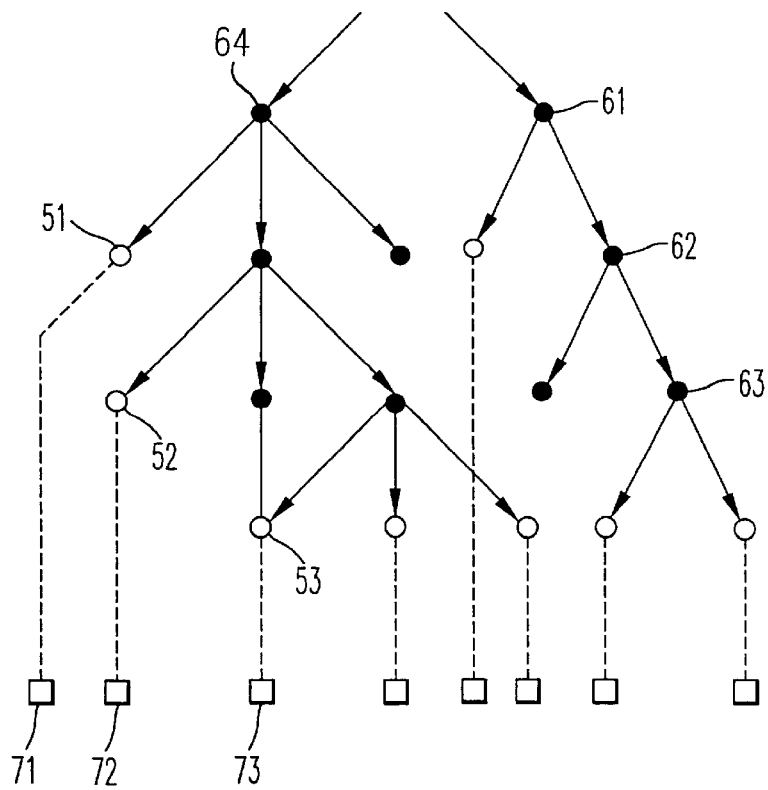
FIG. 6 illustrates goal decomposition with subgoals to be supported by the target system and their corresponding service states.

Service states formation:

The domain model is structured so that there is a mapping between sets of objects in the domain model and the goals. The underlying rationale for the mapping is that a goal should correspond to a state of the system in which it can be achieved i.e an enabling state. A service state can thus be described as a set of objects in specified states. Of course the mapping is always constructible since it is done by, or in interaction with, the users, either directly or indirectly via the domain model. The mapping is illustrated in FIG. 6 in which the subgoals supported by the system, 51, 52, 53 etc. are indicated by unfilled dots and the corresponding states in which these goals are achieved, 71, 72, 73 etc. are indicated by unfilled square dots. The filled dots 61, 62, etc. indicate subgoals that are not supported by the system. If this cannot be achieved the design can only be partially realised.

Table 2

Representation of Subgoals

Subgoal: Name of the subgoal.

Description: A general description of the subgoal.

Sources:
  Goal: The name of the main goal or goal task associated with this subgoal.

Usage aspects:
  Frequency: A description of how often the subgoal is accomplished.
  Criticality: A description of how critical this subgoal is for the main goal.
  Flow of work: User activity patterns of importance for the design, e.g. described in terms of a message sequence chart or a service state graph or multitasking pattern.

Design aspects: A description of factors that determine the design.
  Functional requirements: A description of general requirements on system performance and economic constraints on system design.
  Operational requirements: A description of general requirements on system performance e.g. requirements on reliability and security.
  Design decisions: A description of why this, or these, breakdown(s) into subgoal tasks was chosen and a description of alternate breakdowns considered and why these were not used.

References:
  Service state: A list of the names of the service states, if any associated with this subgoal task.

Subgoal: A list of the names of the subgoals that are parts of the main goal.

The mapping is performed through a traversal of the goal hierarchy, in which the following actions are carried out:

a. Traverse the goal hierarchy creating a covering subset. This is easily done since a covering subset simply contains all leaves or, if a leaf is not in the set, the node above that leaf is in the covering subset. The process simply corresponds to choosing one possible set of subgoals that together form the overall goal.

b. Next, select a relevant subset through selecting the subgoals that are to be supported by the system.

Steps (a) and (b) above correspond to choosing the subgoal tasks that will be supported by the target system.

c. Create a set of service states for the IWS. This is carried out by defining the states of the IWS that allow the user to reach the current goal. In other words, for a relevant subset of goals in the covering subset, define the state of the IWS that allows the user to reach this or these goals. The definition is carried out by creating a set of objects from the domain model, which are in the relevant state. It should be noted that activities directed to reaching the goal in this state do not change the service state of the system.

d. Create a set of service tasks for the system. This is done by specifying the functions that transform the state of the IWS between service states. This may entail the introduction of new objects. These objects together with the totality of objects used in the minimal sets under (b) above form the service objects.

Service states:

These are documented using a table in the form set out in Table 3 below. The process described above results in a model of the IWS which is structured in terms of goal tasks, service tasks, service objects and service states. Service states are connected by service tasks and are the states of the system allowing fulfilment of goal tasks. The service objects are the objects or entities of the IWS the states of which define the service states of the IWS. Goal tasks can be performed either automatically or manually, this is a design decision. Of course, there is backtracking in and between the processes described above.

Table 3

Representaion of a Service State

Service state: Name of the service state.

Description: A description of the service state.

Sources:
Subgoal: The name of the subgoal task(s) associated with this service state.

Usage aspects: A description of how this service state will be used in terms of those properties that are important to the design e.g.
Flow of work: User activity patterns of importance for this service state, i.e. if there are other state that exist at the same time, or if there are a fixed order of service states.
Frequency of use: How often the user is in this service state.
Criticality: A description of how critical this service state is for the accomplishment of the goal.
Service state parameters: A description of the service state parameters of this service state.

Design aspects: A description of factors that determined the design of this service state.
Communicating entities: The names of the entities involved in communication, user—user, user—system, system—system.
Communication channels: A description of the means for communication and the information types communicated.
Interaction requirements: A description of requirements on usability aspects of the service state e.g. in terms of user characteristics, task characteristics etc.

References:
Service objects: A list of the names of those service task objects associated with this service state. This must be done in a way explicitly demonstrating the state of these objects in the service state itself.
Tool-box: A list of the tools corresponding to this service state.

As mentioned earlier it is very important to describe the service objects and their states corresponding to each service state. This is preferably done with a table of the type illustrated in Table 4 below.

Table 4

Representation of a Service Object

Service object: Name of the service object.

Description: A description of the service object.

Sources:
Service tasks: A list of the names of those service tasks that address this object. Service states: The names of the service states that are associated with this object.

Properties: A description of the properties of this service object.
Name: A descriptive name of the property.
Values: The value of the property.
Controlled by: The service task controlling this property.

Behaviour: This can be done by using a number of methods or functions showing signal-response and life-cycle behaviour of the object.

It is very important to describe the service tasks mentioned above in a suitable manner. Service tasks pertain to cognitive aspects of the design, such as navigation, and it is very important to minimise the cognitive and conative load on the user when it comes to service tasks since these can not be automated. Table 5 below illustrates a representation of service tasks.

Table 5

Representation of a Service Task

Service task:

Description: A description of the service task and the effects of this service task on the state of the system.

Sources:
Service state: The name of the service states associated with this service task (starting and goal state).

Usage aspects: A description of how this service task will be used in terms of those properties that are important for the design e.g.
Allocation: A description of how this service task is allocated, to users, to system or to both.
Flow of work: User activity patterns of importance for this service task, i.e. if there are other tasks that exist at the same time, performed parallel to this service task, or if there is a fixed order of service tasks.

Frequency of use: How often the user performs this service task.

Criticality: A description of how critical this service task is for the accomplishment of the service state.

Design aspects: A description of factors that determined the design of this service task.

Functional requirements: A description of requirements on functional aspects of this service task.

Operational requirements: A description of requirements on dynamic aspects of the service task e.g. requirements on reliability and security.

Interaction requirements: A description of requirements on usability aspects of the service task e.g. in terms of user characteristics, task characteristics etc.

References:

Service objects: A list of the names of those service objects associated with this service task.

Functions: A list of the names of the functions performed to accomplish this task.

The purpose of the service task specification scheme is to give an overall description of the interaction between work domain objects in this service state. One implicit purpose is to minimise interaction, particularly between users and other system components, in order to improve integration.

Figure 8:
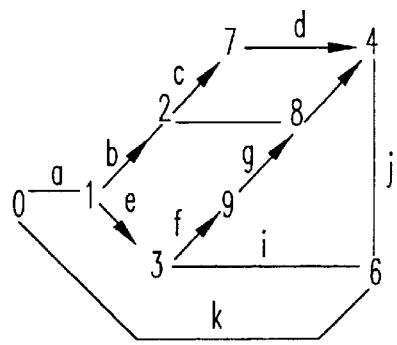
FIG. 8 shows a hypothetical service state graph.

A very important formalism used to verify and analyze parts of the structure arrived at so far is provided by service state graphs. A service state graph is illustrated in FIG. 8. It consists of a set of nodes, corresponding to service states, and a set of vectors (arrows) between nodes, vectors correspond to service tasks. For the system, one measure which correlates to a high degree of usability is the simplicity and relevance of service tasks (the more frequent the simpler). The service state graph shows possible routes between service states and, hence, possible working methods or ways of achieving the overall objective of the task in hand. Note that the vectors can be weighted with a frequency factor showing how often, relatively, a certain vector is taken. This is, of course, an important design parameter. There are a number of design enhancing techniques that are supported by the use of service state graphs.

At this point some definitions and assumptions can usefully be introduced:

Service creation is the design process whereby a service is created.

A service is a customer view of a set of related functions. Services can consist of other services.

A service package is the set of objects implementing a service.

A feature is the smallest set of call processing functions for which a customer will pay. Hence, a service consists of a set of features.

At this stage of the design it becomes important to discriminate between service creation and design of systems and products. If a service is being creating, the service states correspond to service features and the service tasks correspond, for example, to changing the state of a service component and can be regarded as equivalent to utilising a feature manager. However, if the service in question cannot be properly decomposed into service components corresponding to service states the design has to be carried further into the system or even into product design. This of course is strongly related to the subgoal decomposition tree. If a breakdown of a market opportunity main goal into a set of available services is available it is only necessary to design the service manager. If the breakdown results in a set of existing services or features together with some services not currently available, then it will be necessary to implement these services in detail.

At this stage a very important implementation parameter for the method of the invention can be identified. If the service states can be made to correspond to services or service features, the design process is one of service creation and there is no need to carry out the last stages of the requirements specification in detail. In other words there is no need to engage in further detailed design for the following four information types: service objects, service tasks and, to an extent, strips and sequence diagrams.

Possible outputs from the requirement specification are:

Service states:

The states of the IWS allowing performance of the corresponding goal tasks. The service states can be described as a set of service objects in their corresponding states. Note that the service states and their description, augmented with the service tasks, constitutes the main part of the requirements specification. Everything else can be regarded as comment.

Service tasks:

The tasks transforming the system to and between service states. These tasks can be carried out by any component of the IWS, for example a DTE or a human user.

Service objects:

The major objects of the system/service.

Goal tasks:

The tasks of the IWS as perceived by the user organisation. Note that carrying out a service task does not change the state of the system from one service state to another.

Snapshot:

A snapshot of a system shows some aspect of the system in a particular system state. For example the screen layout which appears after logging into a subsystem. Another example is when a telecommunications system is ready to recieve a sequence of digits (dialling) the telephone will be off-hook and a continuous tone will be heard.

Strip:

A strip is a sequence of snapshots demonstrating parts of the system during a typical work procedure. For example a strip could contain a stylized picture of a log-in screen and a stylized picture of a log-out screen.

Service state graphs:

Service state graphs show the states of the work system and how the system can change between states. Vectors demonstrate the actions that change the system between states.

Sequence diagrams:

A sequence diagram demonstrates how the system behaves during a possible user task. Signalling between system objects and the behaviour of objects during activity can be demonstrated.

The above tasks, states and objects constitute the requirements specification. This can be evaluated through the production of a prototype and/or a specification.

Following on from the discussion of the requirements specification the design specification will now be considered. This consists of the production of various categories of information. The number of categories is not restricted by the method of the invention, but for present purposes is limited to four representing, what is probably, the most important special case. These categories are the conceptual, functional, interface and device categories. To ease understanding the categories can be regarded as forming a sandwich structure with conceptual at the top, followed by functional and interface with the device layer at the bottom.

Following production of the design specification a variety of activities may be carried out. The key activities are:

Formalization of the specification, using some formal or implementation language, followed by implementation, optionally with a prototype prior to the implementation. Note that the specification may already be formalized in which case no further formalization is necessary.

Implementation of the specification. Using this strategy the design specification is regarded as a full specification of the target system. This is not unrealistic since the design specification is next to formal provided the specification tables are filled in using a formal language.

Prototype implementation, followed by an implementation or a formalization followed by an implementation.

The categories of information mentioned above, conceptual, functional interface and device are produced by carrying out a mapping of the relevant parts of the information obtained in the requirement specification onto an implementation space, or implementation related primitives. Implementation primitives may range from fairly abstract concepts such as relation types (for example hierarchy or sequence) or abstract data types to data types or the actual appearance of some object on a VDU.

Each category has a corresponding layer. These layers may contain reusable information, components, supply structures and entities. In this way a conceptual specification can be produced from the requirements analysis by using or reusing concepts from the conceptual layer. Similarly the functional specification is produced from the requirements specification by means of a mapping from the requirements specification using or reusing components from the functional layer (these components are functions and objects). This process also holds good for the interface and device layers. Of course, when no reusable component exists design must be performed at the lower levels.

The specification of the entire system includes all of the above specifications.

For each category a prototype can be designed. These can be used for various types of verification and validation, user responses and other activities.

At each layer validation and verification can be performed. Since the layers have been designed from a cognitive point of view there is strong support for evaluating the design at each level of the specification from a cognitive (usability) point of view.

Figure 12:
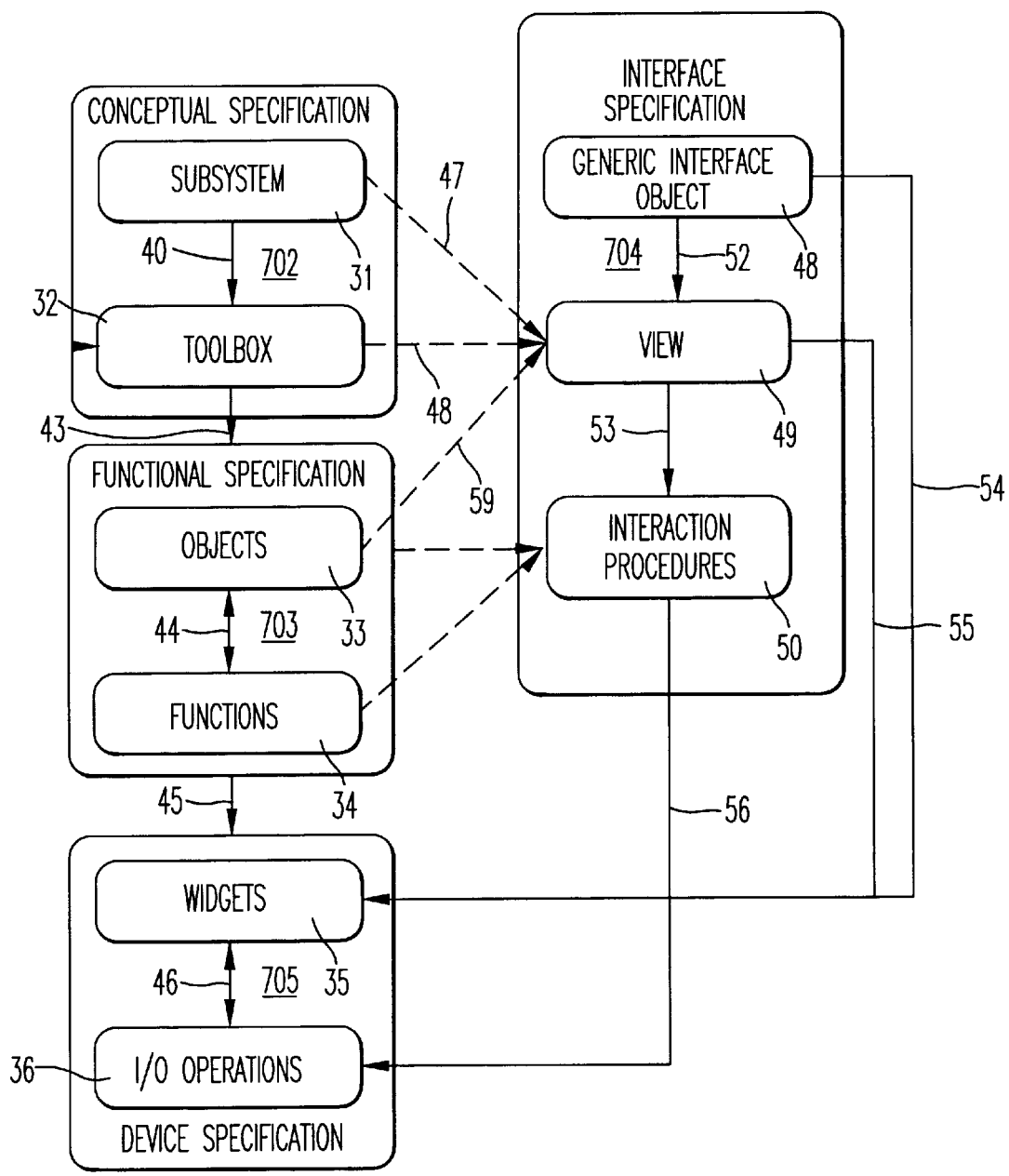
FIG. 12 represents in diagrammatic form the relationship between conceptual specification, functional specification, interface specification, and device specification.

In principle, the information in the categories describe the target system in a hierarchical manner with lower concepts in the lower layers, see FIG. 12.

Each category will, if the design has been completed, have a corresponding specification document. Likewise for each category, a corresponding prototype can be implemented. The content of the layers are as follows:

Conceptual layer:

This layer contains, for example, abstract concepts such as topologies (network, star, ring) and design metaphors (copier interface, dishwasher interface, catalogue) and structures of tasks or tools (hierarchical, network).

Aspects pertaining to this layer are navigational techniques and primitives, work routines and methods and integration of services and service features.

The conceptual layer consists of subsystems and tool boxes. A subsystem can be regarded as a set of related tool boxes and a tool box as a set of related tools and entities (objects). A possible example is a service or system giving support to a sales organisation. Some possible subsystems are the set of tools supporting various roles within the organisation, other subsystems may be task related of goal related.

Functional layer:

This layer simply contains the functions and objects of the chosen implementation technology. A very simple example is a statistical package for a computer system. Other examples are language primitives from a programming language or a data base management system or a data base installation. Other examples are hardware or system components or dialogue procedures and displays. Since the method is centred towards the design of services and products from a human factors point of view, the interface objects and functions are the ones primarily specified. This layer reflects the cognitive models of the user.

Interface layer:

This layer contains entities from the specific user interface metaphor. Examples could be specific windows and interaction procedures. This layer corresponds to the interface of the product, system or service.

Device layer:

This layer is associated with the interfaces on a syntatic level. It contains I/O devices and interaction primitives.

Aspects pertaining to this level are manipulation and perception.

A representation of these layers is shown in FIG. 2.

The order in which the design specification is carried out is in principle indeterminate. However the following order is optimal in the general case:

a. Service states are mapped on the conceptual specification. Service states and service tasks are mapped on subsystems and tools. The relationships between subsystems and tools are established. These activities comprise the conceptual specification. Task analysis is a help in this.

b. Service objects and service tasks are mapped on functions and objects. These are related to subsystems and tools. The result forms the functional specification. Powerful information is obtained from the sequence diagrams.

c. The interface specification is performed by describing the interface representation of relevant objects and functions and the service states. The result of this process is the interface specification. Note that the snapshots and strips designed earlier constitute prototypes or design outlines for the interface representation of various objects.

d. Functions and objects are mapped onto the device specification. Or rather relevant widgets and I/O-operations are ascribed to the functions and objects. The result of this constitutes the device specification. Snapshots may be of great help in this activity.

Although, as stated above, the order of the design specification is, in principle, indeterminate, it should be noted that steps (a) and (b) are interchangeable as are steps (c) and (d). All other design specification is performed in a top down manner.

The design specification consists of four processes, namely:—the conceptual specification, the functional specification, the interface specification, and the device specification which are usually performed in order. These processes will now be described in detail starting with the conceptual specification.

It should, however, be noted that the design specification does not form an essential integer of the invention, but merely one embodiment thereof and can be replaced by, for example, an implementation or a further detailed or even a formal specification in an appropriate specification language using the methods from that language.

The design specification starts with the mapping of the service state graph onto a subsystem and toolbox structure see (a) above. This is carried out in a way which enhances work routines and methods and eases navigation for various user groups, through the mapping of service states or aggregates of service states onto subsystems. Subsystems are preferably documented using the table illustrated in Table 6 below.

Table 6

Representation of a Substystem

Subsystem (or system): Name of the subsystem (or system).
   Description: A general description of the subsystem
      Purpose: A description of the purpose of this subsystem. Does it for example support some specific task or task types or specific organisation(s) or organisational role(s) or offer access to some specific type of tool boxes.
      Domain of knowledge: A description of the kind of knowledge this subsystem has about the application domain and the interface domain.
   Sources:
      Enabling subgoal task: The subgoal task associated with this subsystem
   Usage aspects:
      User groups: A description of important user characteristics.
      Work system: A description of the work system of which this subsystem is a part.
      Work situation: A description of the work situation of in which the subsystem is to be used.
      Flow of work: A description of the flow of work in terms of a service state graph of the service states that this subsystem supports.
      Frequency of use: How often the user uses this subsystem.
      Criticality: A description of how critical this subsystem is for accomplishing the goal.
   Design aspects:
      Design model: A description of the basic metaphors that are to be used as the basis for the design model behind this subsystem.
      Interface model: A description or Figure showing how the design metaphors for this subsystem are visualised in the interface.
      Design principles: User centred principles applied in the design
      Design rational: A motivation for the choice of the above models/metaphors
      Design discrepancies: A description of deviations from the design metaphors and models.
   References:
      Tool boxes: A description of how this subsystem is structured into tool boxes, i.e. sets of functions and objects related to the same service state. These tool boxes are further specified in Table 7 below.

As mentioned previously, a subsystem can be regarded as a set of related toolboxes and a toolbox as a set of related tools and things (objects), and a possible example is a service or system giving support to a sales organization. Possible subsystems are the set of tools supporting various roles within the organization, other subsystems may be task related or goal oriented. The design of tool boxes employs information from the representation table for subsystems as well as the requirements specification. Tool boxes can in general be regarded as task or goal oriented and are aggregates of related tools. The table illustrated in Table 8 below is preferably used to document tool boxes.

Table 7

Representation of a Toolbox

Tool box: Name of the tool box.
   Description: A description of the purpose of the tool box
   Sources:
      Service state: The service state associated with this tool box
      Part of subsystem: The subsystem to which this tool box belongs.
   Usage aspects:
      Flow of work: A description of the flow of work in terms of tool boxes, i.e. the order in which the tool boxes have to be used or if this tool box is to be used at the same time as other tool boxes.
      Frequency of use: How often the user uses this tool box.
      Criticality: A description of how critical this tool box is for accomplishing the goal
   Design aspects:
      Communicating entities: A description of the entities involved in this tool box.
      Functional requirements: A description of requirements on the functional aspect of this tool box e.g. in terms of communication possibilities etc. and actions taken when they are not fulfilled.
      Operational requirements: A description of requirements for dynamic aspects of this tool box e.g. in terms of reliability, security, response time etc. and actions taken when they are not fulfilled.
      Interaction requirements: A description of requirements for usability aspects of this function e.g. in terms of user characteristics etc. A description of how these requirements should be fulfilled and actions taken when they are not fulfilled.
      Design model: A description of the basic metaphors that are to be used as the basis for the design model behind this subsystem.
      Design principles: User centred principles applied in the design.
      Interface model: A description or Figure showing how the design metaphors for this tool box are visualized in the interface.
      Design rationale: A motivation for the choice of the above model/metaphors.
      Design discrepancies: A description of deviations from the design metaphors and models.
      Design solutions: Important decisions about trade offs, solutions applied etc.

User control:
  Preconditions for use: A description of information needed for using this tool box.
  User actions:
  Effects of user actions:
  Feedback:
  Errors:
  Action on errors:
References:
  Functions: A list of the names of those application functions or action-object pairs that constitute this tool box.
  Views: A list of the names of the views that specify how this tool box will appear to the user.

Once the work method orientated, or navigational, structure has been established through the documentation of tool boxes and subsystems, the device specification, i.e. the specification of objects and functions can take place. The input to this activity comes from either or both the conceptual or requirements specification. The mode of operation for this process entails mapping service objects onto objects and tasks onto functions. One important aid in this process are sequence diagrams describing the signalling between objects and the signal response behaviour of functions and objects. Objects and functions can be documented using the relevant representations illustrated in Tables 9 and 10 below. Note however that the detailed representations for objects and functions presented here only apply to user interaction functions and objects. Of course, they can also be used in a stripped down version to describe other functions and objects. However there are many languages and techniques of varying degrees of formality, which are more suitable for describing the behavioural and other aspects of these functions. Examples of these languages and techniques are SDL and LOTOS (formal specification languages), Ada, C++ and SIMULA (programming languages, the latter two object oriented) and conceptual and data modelling techniques.

Table 8

Representation of a Service Object

Service Object: Name of the service object.

Description: A description of the service object.

Sources:
  Service tasks: A list of the names of those service tasks that address this object.
  Service states: The names of the service states that are associated with this object.
Properties: A description of the properties of this service object. Note that a property can be an object recursively and the resultant structure can be documented using a suitable object oriented language.
  Name: A descriptive name of the property.
  Values: The values of the property.
  Controlled by: The service task controlling this property.
Behaviour: The behaviour of an object can be demonstrated using a set of functions responding to signals from the environment (other objects of the IWS). These can be documented using formalisms from, for example the languages and techniques mentioned above. Preferably they are, however, documented using the specification scheme for functions set out in Table 9.

Table 9

Representation of a Function

Function: The name of the function.

Description: A description of the purpose of the function and the effects of this function on the associated service state.

Sources:
  Service task: The service task associated with this function.
  Part of tool box: The tool box to which this function belongs.
Usage aspects:
  Flow of work: User activity patterns of importance for the design, e.g. described in terms of a message sequence chart.
  Frequency of use: How often the user uses this function.
  Criticality: A description of how critical this function is to accomplishing the goal.
  User expectations: A description of the degree to which the user expects this function, object or object-action pair to be a part of the system.
Design aspects:
  Communicating entities: A description of the entities involved in this tool box.
  Functional requirements: A description of requirements on functional aspects of this tool box e.g. in terms of communication possibilities etc. and actions taken when they are not fulfilled.
  Operational requirements: A description of operational requirements on this function e.g. in terms of response time, reliability, security etc. A description of how these requirements should be fulfilled and actions taken when they are not fulfilled.
  Interaction requirements: A description of requirements on usability aspects of this function e.g. in terms of user characteristics etc. A description of how these requirements should be fulfilled and actions taken when they are not fulfilled.
  Kind of function: A description of the degree to which this function can be regarded as a function necessary for the accomplishment of the task, or if not necessary constitutes a more effective way of accomplishing the task.
  Design model: A description of the basic metaphors that are to be used as the basis for the design model behind this subsystem.
  Design principles: User centred design principles that are applied in the design.
  Design discrepancies: Inconsistencies with or discrepancies from the design model or metaphor used and actions taken as a result of these discrepancies.
  Design solution: Important decisions about trade offs, solutions applied etc.
User control:
  Preconditions for use: A description of information needed for using this function.
  User actions: Names of the widgets or interaction procedures by which the user controls this function.
  Effects of user actions: A description of the effects of the user's actions.
  Feedback: A description of the systems response to user actions.
  Errors: A description of possible user errors relating to this function Action on errors: A description of how the system should handle such error.

Device actions: A description of system behaviour invoked by this function.

Name: Name of system action.

Effects: A description of the effects of the system action.

Parameters: A description of the parameters controlling the system action.

Activated by: A description of how the system action is activated.

References:

Widgets: The name of the widget through which the user controls this function.

Interaction procedures: The name of the procedures used to control this function.

Figure 9:
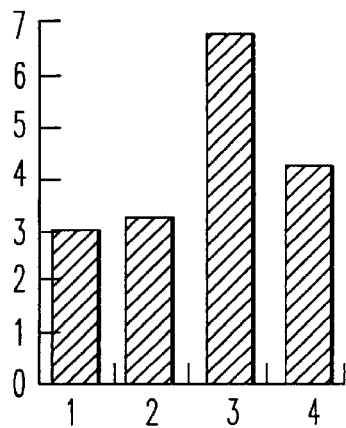
FIG. 9 and FIG. 10 show two possible representations or snapshots of a set of number pairs, as a bar chart and pie graph.
Figure 10:
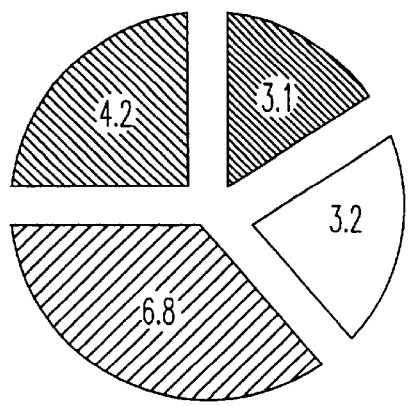

Performance of the interface specification is equivalent to establishing a representation of the relevant objects and functions in the interface. As a simple example consider the number pairs 3,1; 3,2; 6,8 and 4,2 as an object. There are a variety of possible representations of this object, the number pairs could for example be represented as columns or row vectors and a variety of fonts or typographies could be used. Alternatively, either of the two graphical representations shown in FIGS. 9 and 10 could be used. The interface representation begins with the interface representation of subsystems and tool boxes, objects and functions. These representations are referred to as views. It is at this stage that the importance of snapshots becomes apparent. Snapshots are (paper) prototypes or examples of views. A view can be defined as the interface representation of an object. As an example, consider FIG. 11 which is a view corresponding to the snapshot of FIG. 10. Table 10 below illustrates a representation of a view in the interface specification process.

Table 10

Representation of a View

View: The name of the view.

Figure 11:
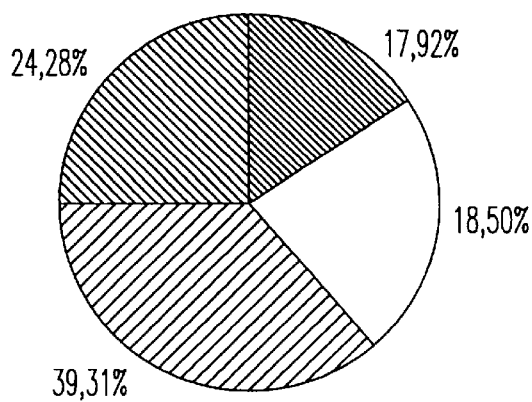
FIG. 11 shows a possible graphical representation of a view corresponding to the snapshots in FIGS. 9 and 10.

Description: A description of the view, a textual description, Figure or prototype. FIG. 11 is a simplified example.

Sources:

Tool box: The name of the associated tool box.

Functions: The name of the functions displayed through this view.

Generic interface object: The name of the generic object from which this view inherits its properties and widgets etc.

Design aspects:

Interaction requirements: A description of requirements on the interaction with this view e.g. in terms of user characteristics etc. and actions taken when they are not fulfilled.

Design principles: User centred principles applied in the design

Design discrepancies: Inconsistencies or discrepancies from the design model used and actions taken as a result of these discrepancies.

Design solutions: Important decisions about the trade offs, solutions applied etc.

User control: A description of how this view is controlled.

Preconditions for use: A description of such things as information needed for control, system mode that enables control etc.

User actions: Name of the widgets or interaction procedures by which the user controls this view.

Effects of user actions: A description of the effects of the user's actions.

Feedback: A description of the systems response to user actions.

Errors: A description of possible user errors.

Action on errors: A description of how the system should handle such error.

Device actions: A description of system behaviour invoked by this function.

Name: Name of the system action.

Effects: A description of the effects of the system action.

Parameters: A description of the parameters controlling the system action.

Activated by: A description of how this system action is activated.

Properties: A description of the properties of this view.

Name: A descriptive name of the property.

Values: The value of the property fix or default.

Controlled by: A description of how this property is controlled e.g. by the user, other procedures or objects.

References:

Widgets: A list of those widgets in this view.

Interaction procedures: A list of those interaction procedures used in this view.

Once a suitable set of views has been described the specification proceeds with the specification of generic interface objects and interaction procedures. The order in which these are performed is immaterial and must be determined by the situation in hand. In general a proper set of generic interface objects already exists and, hence, this precedes the specification of the views. Objects from this set can be used as generic interface objects in the interface specification.

Views are created from generic interface objects some of which are widgets. The view depicted in FIG. 11 can consist of a generic interface object which is simply the window without any content. Complemented with circle sector widgets and text widgets we obtain the view under consideration. Widgets can be regarded as atomic generic interface objects. A representation for generic interface objects is illustrated in Table 11 below.

Table 11

A Representation of a Generic Interface Object

Generic interface object: Name of the generic interface object.

Description: A description of the generic interface object.

Sources:

Views: The view addressed by this generic interface object.

Design aspects:

Operational requirements: A description of requirements on dynamic aspects of the generic interface object e.g. in terms of reliability, security etc.

Interaction requirements: A description of requirements on usability aspects of the generic interface object e.g. in terms of user characteristics etc.

Design principles: User centred principles applied to the design.

Design discrepancies: Inconsistencies and discrepancies from the design model used.

Design solution: Important decisions about trade offs, solutions applied etc.

System actions: A description of system behaviour invoked by this generic interface object.
  Name: Name of the system action.
  Effects: A description of the effects of the system action.
  Parameters: A description of the parameters controlling the system action.
  Activated by: A description of how this system action is activated.
Properties: A description of the properties of this generic interface object.
  Name: A descriptive name of the property.
  Values: The value of the property.
  Controlled by: A description of how this property is controlled e.g. by the user, other procedures or objects.
References:
  Widgets: References to those widgets used in this generic interface object.

The interaction between users and the rest of the IWS can be described using the interaction procedure scheme illustrated in Table 12 below.

Table 12

Representation of an Interaction Procedure

Interaction procedures: Name of the interaction procedure.
Description: A description of the interaction procedure.
Sources:
  Functions: A list of the functions that use this interaction procedure.
  View: The view addressed by this interaction procedure.
Usage aspects:
  Flow of work: User activity patterns of importance for the use of this interaction procedure.
  Frequency of use: How often the user uses this interaction procedure.
Design aspects:
  Operational requirements: A description of requirements on dynamic aspects of the interaction procedure e.g. in terms of reliability, security etc.
  Interaction requirements: A description of requirements on usability aspects of the interaction procedure e.g. in terms of user characteristics etc.
  Design principles: User centred principles applied in the design.
  Design discrepancies: Inconsistencies or discrepancies from the design model.
  Design solutions: Important decisions about trade offs, solutions applied etc.
User control:
  Preconditions for use: A description of such things as information needed for control, system mode that enables control of this interaction procedure.
  User actions: A description of how the user controls this interaction procedure.
  Effects of user actions: A description of the effects of the user's actions.
  Feedback: A description of the systems response to user actions.
  Errors: A description of possible user errors.
  Action on errors: A description of how the system should handle such errors.
System actions: A description of system behaviour invoked by this interaction procedure.
  Name: Name of the system action.
  Effects: A description of the effects of the system action.
  Parameters: A description of the parameters controlling the system action.
  Activated by: A description of how this system action is activated.
Properties: A description of the properties of this system action procedure.
  Name: A descriptive name of the property.
  Values: The value of the property.
  Controlled by: A description of how this property is controlled e.g. by the user, other procedures or objects.
References:
  I/O operations: References to those I/O operations invoked by this interaction procedure.

Turning now to the device specification, this process is concerned with the definition of relevant widgets and input/output operations. The representations of widgets and input/output procedures are illustrated in Tables 13 and 14 below.

Table 13

Representation of a Widget

Widget: The name of the widget.
Description: A description of the widget or a figure.
Sources:
  Functions: A list of the functions using this widget.
  Views: A list of the views using this widget.
  User procedures: A list of the user procedures using this widget.
  Generic interface objects: A list of the generic interface objects using this widget.
Usage aspects:
  Frequency of use: How often the user uses this widget.
  User expectations: A description of the degree to which the user expects this widget to be part of the system.
Design aspects:
  Operational requirements: A description of requirements on dynamic aspects of this widget e.g. in terms of reliability security etc.
  Interaction requirements: A description of requirements on usability aspects of this widget e.g. in terms of user characteristics etc.
  Design principles: User centred principles applied in the design.
  Design discrepancies: Inconsistencies or discrepancies from the design model used.
  Design solutions: Important decisions about trade offs, solutions applied etc.
User control: A description of how this object is controlled by the user in terms of:
  Preconditions for use: A description of such things as information needed for control, system mode that enables control, of this widget etc.
  User actions: A description of how the user controls this widget.
  Effects of user actions: A description of the effects of the user's actions.
  Feedback: A description of the system response to user actions.
  Errors: A description of possible user errors.
  Action on errors: A description of how the system should handle such error.
System actions: A description of system behaviour invoked by this widget.

Name: Name of the system action.
Effects: A description of the effects of the system action.
Parameters: A list of the parameters controlled by the system action.
Activated by: A description of how this system action is activated.
Properties: A description of the properties of this widget.
Name: A descriptive name of the property.
Values: The value of the property.
Controlled by: A description of how this property is controlled e.g. by the user or other procedures or objects.
References:
I/O operations: References to those I/O operations invoked by this widget.

Table 14

Representation of an I/O Operation

I/O operations: The name of the input/output operation.
Description: A description of the input/output operation.
Sources:
Functions: A list of the functions using this input/output operation.
Views: The views addressed by this input/output operation.
Usage aspects:
Flow of work: User activity patterns of importance for the use of this input/output operation.
Frequency of use: How often the user uses this input/output operation.
Design aspects:
Operational requirements: A description of requirements on dynamic aspects of this I/O operation e.g. in terms of reliability security etc.
Interaction requirements: A description of requirements on usability aspects of this I/O operation e.g. in terms of user characteristics etc.
Design principles: User centred principles applied in the design.
Design discrepancies: Inconsistencies or discrepancies from the design model used.
Design solutions: Important decisions about trade offs, solutions applied etc.
User control:
Preconditions for use: A description of such things as information needed for control, system mode that enables control of this I/O operation etc.
User actions: A description of how the user controls this I/O operation.
Effects of user actions: A description of the effects of the user's actions.
Feedback: A description of the system response to user actions.
Errors: A description of possible user errors.
Action on errors: A description of how the system should handle such error.
System actions: A description of system behaviour invoked by this I/O operation.
Name: Name of the system action.
Effects: A description of the effects of the system action.
Parameters: A list of the parameters controlled by the system action.
Activated by: A description of how this system action is activated.
Properties: A description of the properties of this I/O operation.
Name: A descriptive name of the property.
Values: The value of the property.
Controlled by: A description of how this property is controlled e.g. by the user or other procedures or objects.
References:
I/O operations: References to those other I/O operations invoked by this I/O operation.

Before describing a design engine which can be used to implement the method of the invention, the method will be briefly reviewed.

Turning first to FIG. 5, the core of the invention comprises a method for obtaining a requirement specification for a product, system or service in which a user model is continuously updated by interaction with the market, 20, or end user. The primary goal of the user is identified and broken down into a subgoal structure, 22. The primary goal can be recorded in the form of a goal representation of which one example is illustrated in Table 1. The individual subgoals obtained from method step 22 can be recorded in the form of subgoal representations, an example of which is shown in Table 2. In the next step of the method, 24, a subset of the subgoals is generated which is sufficient to satisfy the main goal. After this, service states of the target product, system or service are determined from the covering (of the primary goal) subset of subgoals, 26, and representations of these service states recorded. The representations of service states may be in the form illustrated in Table 3. Finally service objects and service tasks are derived in method steps 28, and 30. Representations of the service states and service tasks are recorded in an appropriate from such as that illustrated in Tables 4 and 5.

The aggregate of all the representations of primary goals, subgoals, covering subset of subgoals, service states, service objects and service tasks is the requirement specification of the target product, system or service. All steps of the method can include suitable verification procedures such as prototyping, and may be revisited on an iterative basis.

Where a target service, for example, can be constructed from existing service features, so that what is to be produced for the customer is essentially a feature manager, the above method steps are sufficient in themselves. It should however be recognised that as a result of changes in the user model or discrepancies discovered in the representations, iterations of the process steps may be necessary. The method may, in whole or in part be automated, a process which is facilitated by the use of formal and semiformal representations through which the mutual relationships between the different method steps is established.

The method can be further developed by including the steps, illustrated in FIGS. 4 and 12, of conceptual specification 702, functional specification 703, interface specification 704 and device specification 705.

The process of conceptual specification leads to the identification and representation of subsystems and toolboxes in subprocesses 31 and 32. Examples of representations of these are illustrated in Tables 6 and 7.

The process of functional specification 703, leads to the identification and representation of service objects and functions in subprocesses 33 and 34. Examples of representations of these are illustrated in Tables 8 and 9.

The process of interface specification 704, leads to the identification and representation of generic interface objects, views and interaction procedures in subprocesses 48, 49, and 50. Examples of representations of these are illustrated in Tables 10, 11, and 12.

The process of device specification 705, leads to the identification and representation of widgets and I/O operations in subprocesses 35 and 36. Examples of representations of these are illustrated in Tables 13 and 14.

The individual process steps, conceptual specification 702, functional specification 703, interface specification 704, and device specification 705 are neither performed in isolation from each other or from the core process of requirement specification 701. Some of the mutual relationships which can be established are shown in FIGS. 4 and 12. For example relationships 37, 38 can be established between the process of defining service states 26 and the subprocesses of identifying and representing subsystems and toolboxes 31 and 32. Another relationship 39, is that between the process of requirement specification 701 and the process of functional specification 703. Further relationships 47, 48, 59, 54 . . . etc. can be clearly identified in FIG. 12. These are not the only relationships which are possible.

Figure 13A:
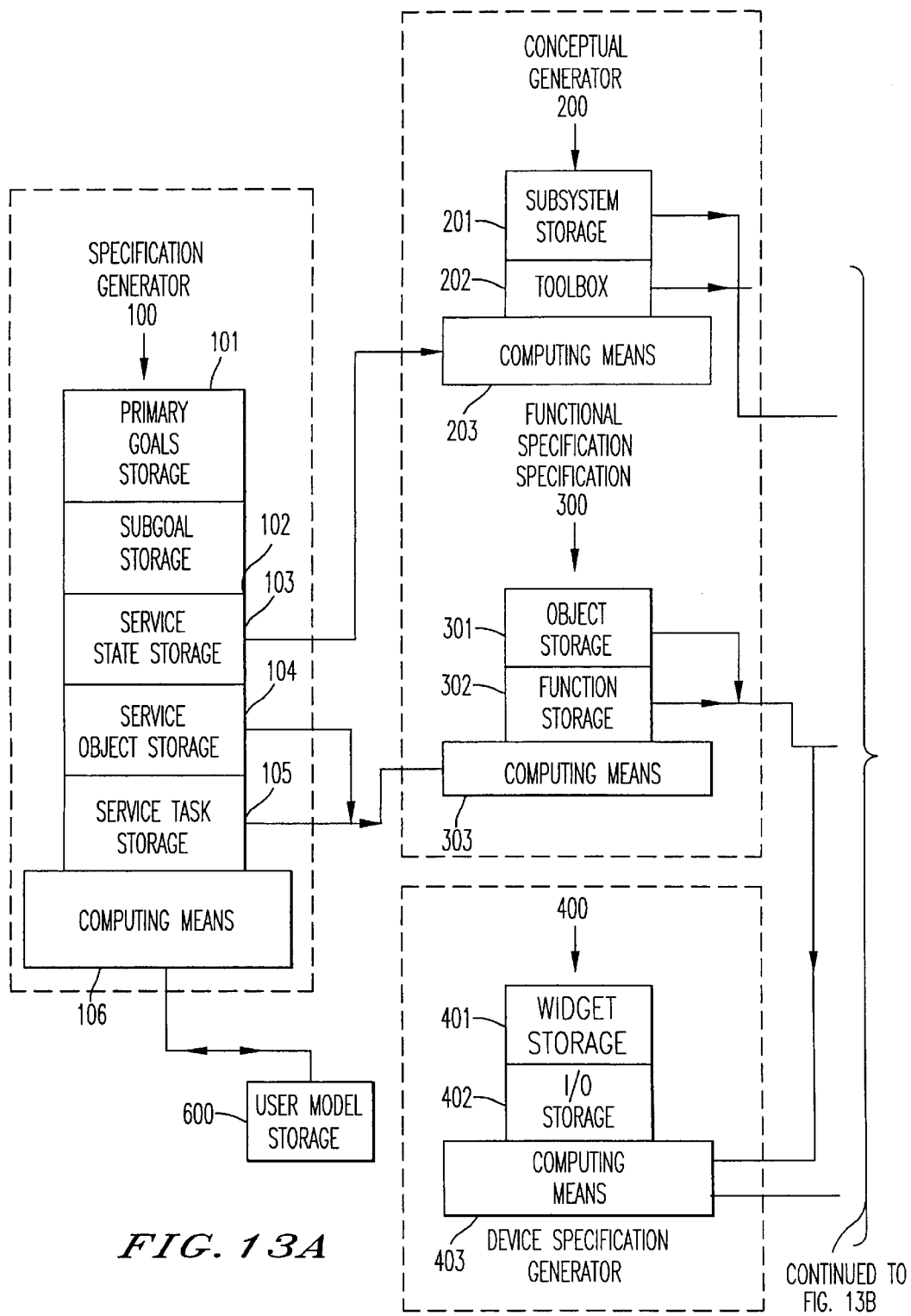
FIG. 13 shows a schematic representation of a design engine.
Figure 13B:
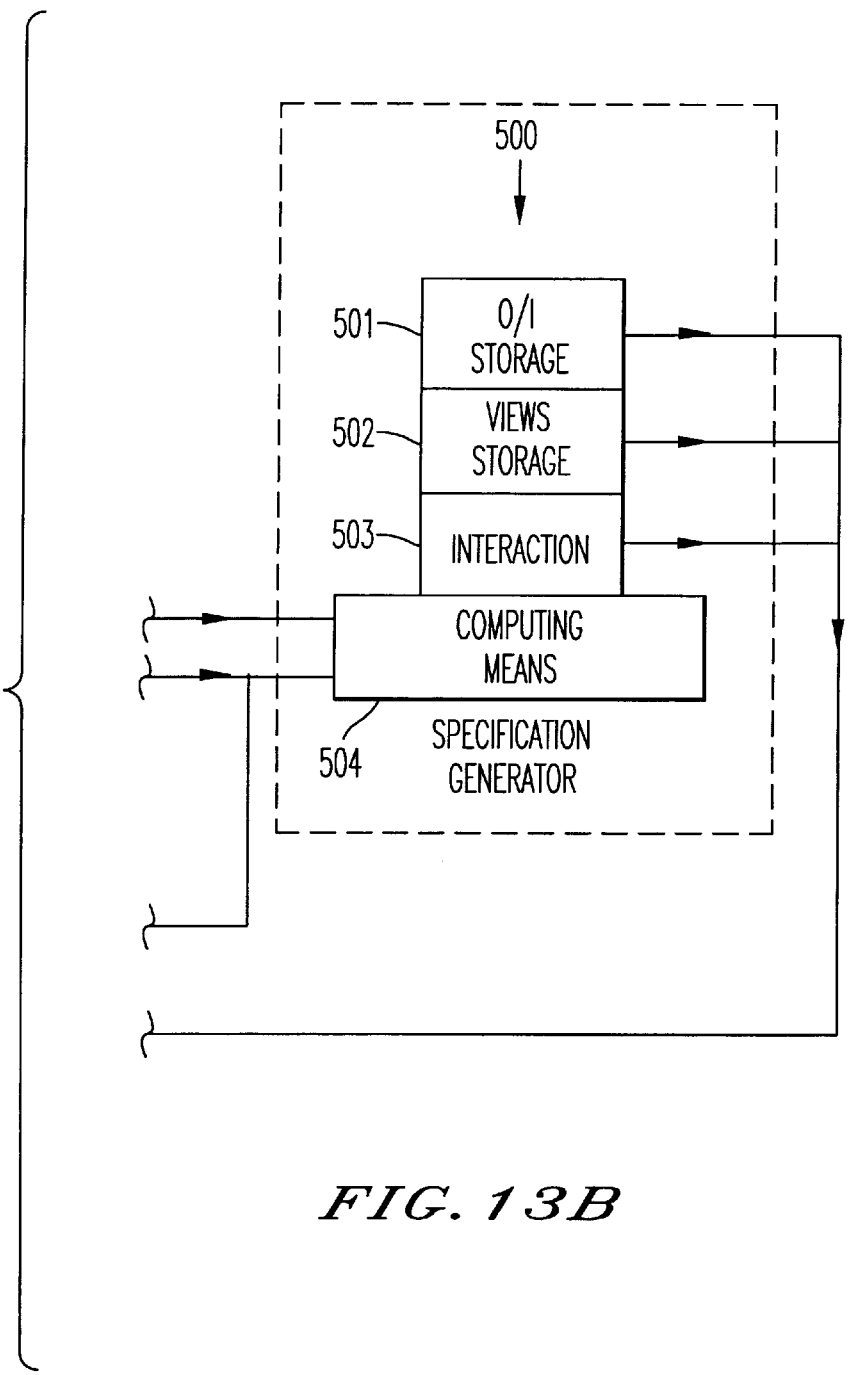

Turning now to the construction of a design engine on which the method of the present invention can be implemented, such a design engine is shown in diagrammatic form in FIG. 13. It comprises 5 specification generators, 100, 200, 300, 400 and 500, which may be individual computers operating in parallel or virtual computing means implemented by programming an appropriate computer. In addition to the specification generators there is provided a computer, 600, in which is held the user model for the target system. This can of course be updated by appropriate means such as a keyboard and/or from a remote data source.

Each of the specification generators comprises a partitioned data memory and computing means which can access each partition of the data memory together with certain partitions of the data memories belonging to other specification generators.

The requirement specification generator which is in many ways the core of the present invention has computing means 106 and storage partitions 101 for representations of primary user goals, 102 for representations of subgoals, 103 for representations of service states, 104 for representations of service objects, and 105 for representations of service tasks. The computing means 106 is able to access each of the memory partitions 101 . . . 105 and, in addition, the user model held on computer 600.

The conceptual generator 200, comprises two memory partitions, 201 and 202 in which are stored representations of subsystems and toolboxes. The computing means 203 of the conceptual specification generator can access the service state partition 103 of the requirement specification generator in addition to its own memory partitions 201 and 202.

The functional specification generator 300, comprises two memory partitions 301 and 302 in which are stored representations of objects and functions. The computing means 303 of the functional specification generator can access representations of service objects and service tasks held in memory partitions 104 and 105 of the requirement specification generator in addition to its own memory partitions 301 and 302.

The interface specification generator 500, comprises three memory partitions 501, 502, 503 in which are stored representations of generic interface objects, views and interaction procedures. The computing means 504 of the interface specification generator can access representations of subsystems, toolboxes, objects and functions held on memory partitions 201, 202, 301 and 302, in addition to its own memory partitions 501, 502 and 503.

The device specification generator 400, comprises two memory partitions 401 and 402 in which are stored representations of widgets and I/O operations. The computing means 403 of the device specification generator can access representations of objects, functions, generic interface objects, views and interaction procedures held in memory partitions 301, 302, 501, 502 and 503 in addition to its own memory partitions 401 and 402.

The operation of the entire design engine is controlled by a programable controller, not shown in FIG. 13.

What is claimed is:

1. A computer-implemented design system for designing at least one of a product specification and a prototype of at least one of a system and a service, comprising:

a digital central processing means;

a computer memory;

model digital storage means coupled to said digital central processing means, said model digital storage means storing a usage specification representing a predefined user model of at least one of a product specification and a prototype of at least one of a system and a service to be implemented, said predefined user model comprising plural user goals and plural user sub-goals, wherein said plural user goals and said plural user sub-goals include names for associating said plural user sub-goals with corresponding goals of said plural user goals;

extraction means coupled to said model digital storage means for extracting said plural user goals and corresponding sub-goals of said plural user sub-goals from the model digital storage means;

topological structure creating means coupled to said extraction means for creating a linked list topological tree structure of said plural user sub-goals, with said plural user goals being represented by goal nodes and said plural user sub-goals corresponding to descendants of the goal nodes in the linked list topological tree structure being represented by descendent nodes of corresponding goal nodes;

sub-goal topological digital storage means coupled to said topological structure creating means for storing a digital representation of said linked list topological tree structure of said plural user goals and said corresponding sub-goals;

service state creation means coupled to said digital central processing means for analyzing said plural user goals and said corresponding sub-goals and for creating a service state table of plural service states based upon said plural user goals and said corresponding sub-goals; and aggregation means for creating a digital representation in said computer memory of said at least one of said product specification and said prototype of at least one of said system and said service to be implemented in response to the digital representation of the linked list topological tree structure and said service state table.

2. A system as in claim 1 further comprising:

service object analysis means coupled to said model digital storage means for creating a topological structure of service objects; and topological service object memory means for storing a digital representation of the service objects.

3. A system as in claim 1 further comprising:

service task analysis means coupled to said model digital storage means for creating a topological structure of service tasks; and topological service task memory means for storing a digital representation of the service tasks.

4. A system as claimed in claim 1, further comprising:

model modification means for altering the predefined user model stored on the model digital storage means; and topological structure modification means for altering the linked list topological tree structure to reflect alterations made to the predefined user model by the model modification means.

5. The system as claimed in claim 1, further comprising:

input means coupled to said model digital storage means for inputting said plural user goals and said plural user sub-goals into said model digital storage means, said input means including means for assigning names to the plural user goals and the plural user sub-goals; and, wherein each of the plural user sub-goals comprises a name of a corresponding goal of said plural user goals for which each sub-goal is a sub-goal.

6. The system as claimed in claim 5, wherein the topological structure creating means builds the linked list topological tree structure of the plural user goals and the plural user sub-goals based on the names of the plural user goals and the plural user sub-goals.

7. The system as claimed in claim 1, further comprising:

means for storing said prototype of at least one of said system and said service as specified by the plural user goals and the plural user sub-goals.

* * * * *